United States Patent
Zeldman

[11] 3,875,891
[45] Apr. 8, 1975

[54] FILTER MALFUNCTION DETECTOR

[75] Inventor: Maurice I. Zeldman, Pittsburgh, Pa.

[73] Assignee: Rockwell International Corporation, Pittsburgh, Pa.

[22] Filed: Apr. 10, 1973

[21] Appl. No.: 349,659

[52] U.S. Cl......... 116/114 R; 116/DIG. 25; 55/274; 55/DIG. 34; 73/28; 73/118
[51] Int. Cl. .................................. G01d 13/00
[58] Field of Search ............ 55/210, 215, 218, 270, 55/274, DIG. 14, 18, 410, 21, 310, 313, 413, 414, DIG. 34; 116/114 AD, 114 R, 70, DIG. 25; 73/28, 422 TC, 118; 340/237 P

[56] References Cited
UNITED STATES PATENTS
3,696,666  10/1972  Johnson et al................. 73/28 X

*Primary Examiner*—Frank W. Lutter
*Assistant Examiner*—David L. Lacey

[57] ABSTRACT

A filter malfunction detector comprising detecting means including an inertial separating means adapted to remove certain stray particulate matter from gaseous streams that have avoided entrapment in an initial filter media barrier due to a malfunction of said media barrier, sensing means operably connected to said inertial separating means to sense the presence or absence of said particulate matter in said inertial separating means.

1 Claim, 4 Drawing Figures

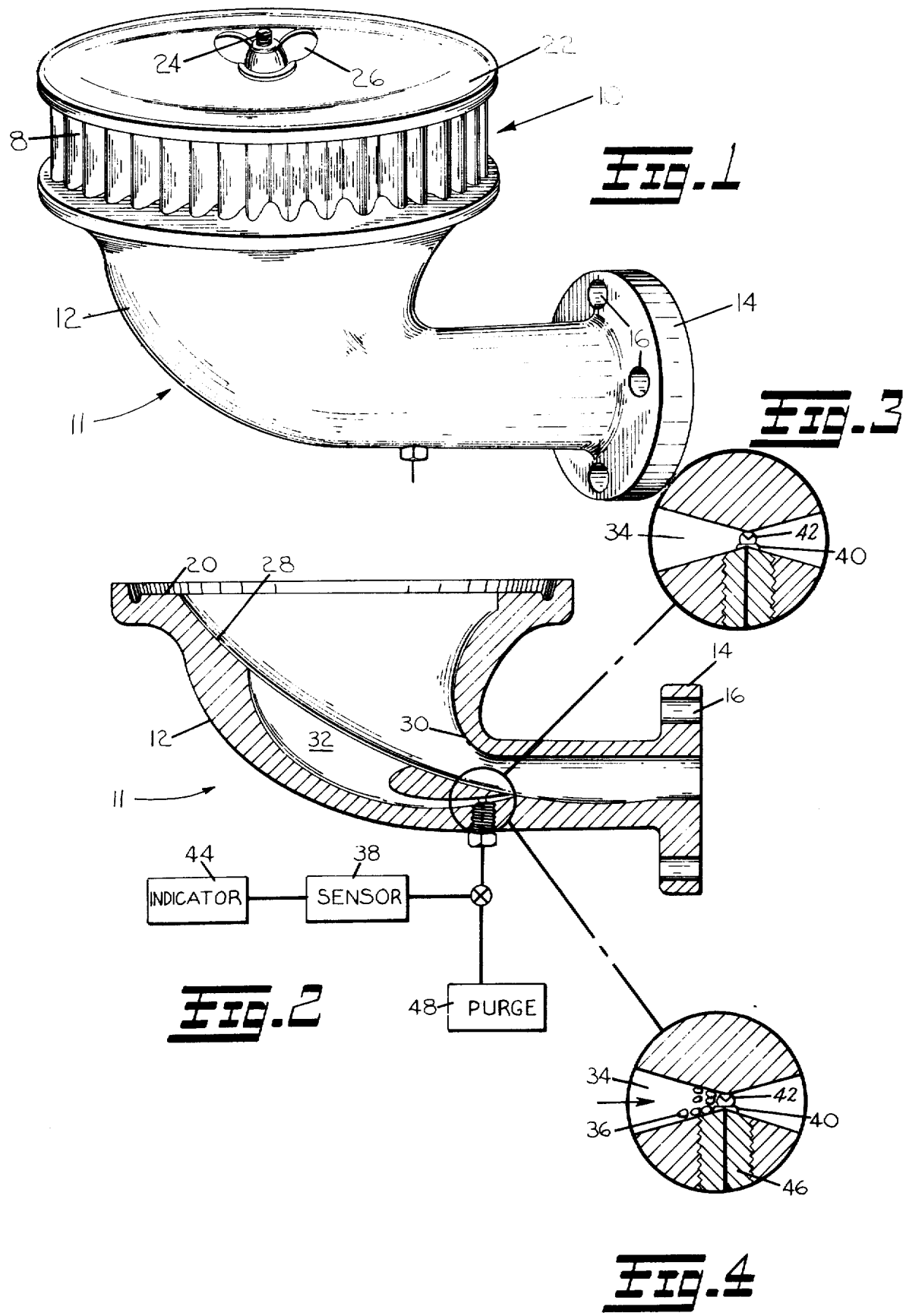

FILTER MALFUNCTION DETECTOR

BACKGROUND OF THE INVENTION

This invention relates generally to filter malfunction devices and in particular to filter malfunction devices adapted to detect the malfunction of the filter media barrier of a filter.

As is well known, filters are used in many applications to protect the working parts of an associated apparatus from dirt laden air or the like. Most typically filters are used to filter particulate matter from gaseous streams.

A typical specific application of such a filter may be formed in the internal combustion engine air intake system. Great quantities of air are needed by internal combustion engines and this intake air must be clean and free of particulate matter. Any dirt could cause serious damage to the various engine parts such as the carburetor, piston rings, valves and the like. Many other similar examples of filter applications could be cited in which the need for clear air is critical.

The prior art is replete with many forms of filtering apparatus and detectors to determine filter operational efficiency.

One typical form of filter device is the pleated paper element type filter which, as its name implies, utilizes treated pleated paper as the filter media barrier. This has proven to be a highly efficient filter media which can be inexpensively manufactured using high volume techniques. One major drawback of the pleated paper filter element is its structural weakness which might result in pinholes or the like. The holes or openings will, of course, allow dirt and other foreign matter to pass through the filter downstream to the working parts of the associated apparatus.

Overloading of the filter media can cause another mode of filter media malfunction.

Obviously, it is important to anticipate the impending malfunction of the filter and this was typically done by utilizing differential pressure indicator. The differential pressure indicator is effective in sensing the filter overloading mode but is totally unsuited to sensing a partial malfunction mode such as that caused by small pinholes or the like. In fact such partial malfunction modes cause a misleading signal to be generated by the differential pressure indicator. Accordingly a partial malfunction will go undetected by a differential pressure indicator allowing dirty air to continue to avoid the filter media barrier and flow downstream.

SUMMARY OF THE INVENTION

Accordingly it is a primary object of the present invention to provide a filter assembly comprising a filter means having a filter media barrier, said filter media barrier operably disposed in a gaseous stream to filter foreign matter from said gaseous stream, detecting means including an inertial separating means adapted to remove certain stray particulate matter from the gaseous stream that has avoided entrapment in said filter media barrier due to a malfunction of said media barrier, sensing means operably connected to said inertial separating means to sense the presence or absence of said particulate matter in said inertial separating means.

It is another object of the present invention to provide a filter malfunction detector in which the sensing means generates a signal indicative of the presence or absence of said particulate matter in said inertial separating means, said signal being inputed to an indicating means adapted to indicate the presence or absence of said particulate matter in said inertial separating means.

It is still another object of the present invention to provide a filter malfunction detector in which the inertial separating means is disposed in the gaseous stream at a point of curvature in the stream said curvature being defined by an inner surface of a housing to which the filter means is operably attached.

It is still another object of the present invention to provide a filter malfunction detector in which the sensing means includes a pneumatic fluid logic amplifier in communication with the inertial separating means.

It is yet another object of the present invention to provide a filter malfunction detector in which the inertial separating means is integral with the housing, said inner contour of the inertial separating means being defined by the inner surface of said housing, the radius of curvature of the said curvature of the inner surface of the housing being directly related to the particle size of particulate matter to be separated from the gaseous stream by the inertial separating means.

It is still another object of the present invention to provide a filter malfunction detector in which the inertial separating means is provided with a particle collection area, the sensing means sensing the presence or absence of said particles in the collection area.

It is yet another object of the present invention to provide a filter malfunction detector in which the inertial separating means is provided with purging means to clean the inertial separating means.

It is still another important object of the present invention to provide a filter malfunction detector in which the sensing means is provided with a sensing head disposed at the collection area, the sensing head being integral with a threaded plug means, the plug means being removable from the housing.

Other objects and advantages of the invention will become apparent as the present invention is better understood from the following disclosure and as shown in the accompanying drawings.

DESCRIPTION OF THE DRAWINGS

The accompanying drawings, referred herein and constituting a part hereof, illustrate an embodiment of the invention, and together with the description, serve to explain the principles of the invention.

In the drawings:

FIG. 1 is a side perspective view of a filter media barrier operably attached to a housing incorporating the filter malfunction detector in accordance with the present invention;

FIG. 2 is a sectional view of the housing of the detector of FIG. 1 showing the general placement of the filter malfunction detector in accordance with the present invention;

FIG. 3 is an enlarged sectional view of the collection area of the filter malfunction detector of FIG. 2 without any particulate matter collected therein;

FIG. 4 is an enlarged sectional view of the collection area of the filter malfunction detector of FIG. 2 with separated particulate matter collected therein.

DETAILED DESCRIPTION OF THE DRAWINGS

Referring now to the drawings, there is shown a filter assembly 10 which is particularly adapted to be operably attached to an air or other gaseous intake system (not shown). Such an air intake system might be an air intake system for an internal cumbustion engine.

The filter assembly 10 includes therein the filter malfunction detector 11 of the present invention which may include a housing 12 which may be provided with attaching means such as flange 14.

The flange 14 may be provided with a series of holes 16 adapted to register with like holes of a complimentary flange (both not shown) for operational attachment to an air or gaseous stream intake system. The primary purpose of the filter assembly 10 is to provide a clean gaseous stream to the intake system.

The housing 12 is adapted to receive in an air-tight relationship a filter element 18. The filter element 18 may be of the pleated paper type sealed at each end with an appropriate plastic material which also acts as air sealing surfaces with the housing 12. The lower end of the filter element 18 may effect its air-tight seal with a horizontal surface 20. The upper end of the filter element 18 may effect its air-tight seal with a cover plate 22. The cover plate 22 may be held in operational position by a bolt 24 suitably fixedly attached to the housing by non-obstructing strut member (not shown). A wing nut 26 of other suitable fastening means could be used to maintain the air-tight integrity of the filter assembly 10.

In this particular configuration the filter element 18 would function as an outside-inside flow filter. That is the ambient air would be outside the filter media barrier and flow through it and into the air intake system.

The function of the filter malfunction detector 11 can be best described and understood by reference to FIG. 2, FIG. 3 and FIG. 4.

The housing 12 is provided with an inner surface 28 which, among other things, defines the entrance to the air intake system.

The inner surface 28 of the housing 12 may be formed with a radius of curvature 30. The intake air stream therefor will "bend" around the radius of curvature 30 thereby effecting an inertial effect on any particulate matter contained in the air stream. The inertial effect will drive particulate matter of a predetermined size into a peripheral area 32 contiguous with and an extension of the inner surface 28 of the housing 12.

It is important to note that by proper selection of the degree of radius of curvature 30, i.e. the degree of severity of curvature, will have a direct relationship to the size of particle driven into the peripheral area 32.

The more severe the curvature the smaller the particle that will be removed from the air stream.

The particle that is removed from the air stream and driven into the peripheral area 32 is driven into a collection area 34. A "clean" collection area 34 can be seen in FIG. 3 while a particle laden collection area 34 can be seen in FIG. 4 wherein the particles are denoted by numeral 36.

As the particles 36 collect in the collection area the flow characteristics through a sensing means 38 will change. That is, as the particles 36 increase in number the sensing device will detect a reduction in the flow volume and/or air pressure and/or pressure drop or any combination thereof.

The air flow characteristics could be sensed by such suitable means as for example a pneumatic fluid logic amplifier. The sensing head 40 of the fluid logic amplifier 42 could be strategically placed in the filter malfunction detector collection area to sense the presence or absence of particles.

It can be seen therefor, that any partial or complete malfunction of the filter media barrier of the filter element 18 will be almost immediately sensed by the fluid logic amplifier 42.

The sensing means 38 could be adapted to generate an output signal which could be inputed to an indicating means 44.

The indicating means 44 could, of course, be in combination with the sensing means or separate thereto. It could be a pneumatic, electrical or electronic device. It is to be understood, however, that state of the art devices could be used as the sensing means 38 and the indicating means 44 and that the primary thrust of the present invention is provision of the above filter malfunction detecting means. In this regard a standard differential pressure indicator could be used to measure any change in the pressure drop across the detector.

The indicating means 44 could be further provided with alarm means to warn the operator of an impending failure of the filter element 18.

The head 40 of the fluid logic amplifier 42 could be integral with a threaded plug 46 which would readily facilitate removal of the head 40 from the collection area 34 for maintenance purposes.

Periodic cleaning of the head 40 and the collection area 34 could also be achieved without removal of the threaded plug 46 by purging means 48.

The purging means 48 could be pneumatically connected to the head 40 of the fluid logic amplifier 42. Air blasts could be selectively used to purge the area of collected particles 36 and to clean the head 40.

It should now be apparent that a filter malfunction detector embodying the concept of the present invention is particularly adaptable to anticipate partial or gross failures of a filter element and is also capable of accomplishing the other objects of the present invention.

I claim:

1. A filter malfunction detector for a filter element having a filter media barrier for removing particulate matter from intake air for an apparatus, said detector comprising a housing, said housing capable of being fixedly and sealably joined to a connection of an air intake of said apparatus and including a throat extending therethrough to have a first end which is capable of being attached with said air intake of said apparatus, said housing having a mounting portion thereon at a second end of said throat capable of holding in sealable relationship thereto said filter element, said throat having a curved portion between said second end and said first end, said curved portion being capable of bending a stream of said intake air as it passes therethrough thereby generating a centrifugal force of any of said particulate matter in said stream, a particulate matter collection area formed integral with said housing in communication with said throat and disposed at said curved portion of said throat to extend generally outwardly thereof to collect a portion of said particulate matter removed from said stream by said centrifugal force applied thereto, and a sensing means in communication with said collection area to detect the presence or absence of said particulate matter in said collection area whereby the level of said particulate matter passing through said filter media barrier may be monitored.

* * * * *